United States Patent
Park

(10) Patent No.: US 7,353,927 B2
(45) Date of Patent: *Apr. 8, 2008

(54) ELECTRO-MAGNETIC ACTUATOR FOR TORQUE COUPLING WITH VARIABLE PRESSURE-CONTROL SPOOL VALVE

(75) Inventor: Jungho Park, Ann Arbor, MI (US)

(73) Assignee: Dana Automotive Systems Group, LLC., Toledo, OH (US)

( * ) Notice: Subject to any disclaimer, the term of this patent is extended or adjusted under 35 U.S.C. 154(b) by 223 days.

This patent is subject to a terminal disclaimer.

(21) Appl. No.: 11/236,493

(22) Filed: Sep. 28, 2005

(65) Prior Publication Data

US 2007/0068763 A1    Mar. 29, 2007

(51) Int. Cl.
*B60K 17/35* (2006.01)
*F16D 25/0638* (2006.01)

(52) U.S. Cl. ............................ 192/85 AA; 192/103 F; 475/88

(58) Field of Classification Search ................ 475/88; 192/54.3
See application file for complete search history.

(56) References Cited

U.S. PATENT DOCUMENTS

| | | | |
|---|---|---|---|
| 2,601,549 A | 6/1952 | Morton et al. | |
| 2,627,544 A | 2/1953 | Eck | |
| 4,316,599 A * | 2/1982 | Bouvet et al. | ......... 251/129.08 |
| 4,538,700 A | 9/1985 | Suzuki | |
| 4,702,212 A | 10/1987 | Best et al. | |
| 5,163,477 A | 11/1992 | Takano et al. | |
| 5,709,627 A | 1/1998 | Teraoka | |
| 6,202,697 B1 | 3/2001 | Oyama et al. | |
| 6,435,213 B2 | 8/2002 | Lou | |
| 6,692,396 B1 | 2/2004 | Grogg et al. | |
| 6,695,284 B2 | 2/2004 | Isobe et al. | |
| 2001/0017116 A1 | 8/2001 | Eguchi | |
| 2004/0226619 A9 | 11/2004 | Lou | |
| 2005/0037885 A1 | 2/2005 | Schrand | |
| 2007/0080039 A1 * | 4/2007 | Park | .................. 192/85 AA |

* cited by examiner

*Primary Examiner*—Rodney H Bonck
(74) *Attorney, Agent, or Firm*—Berenato, White & Stavish

(57) ABSTRACT

A torque-coupling assembly comprises a rotatable torque-coupling case, a friction clutch assembly for selectively engaging the torque-coupling case and an output shaft, a hydraulic pump for generating a hydraulic fluid pressure, a fluid control passage through which a hydraulic fluid is discharged from the torque-coupling case, and a variable pressure-control valve assembly to selectively control the clutch assembly. The variable pressure-control valve assembly includes a spool valve disposed in the fluid control passage and an electro-magnetic actuator. The electro-magnetic actuator is provided for producing a variable axial electro-magnetic force acting to the spool valve so as to selectively adjust a position of the spool valve in the fluid control passage in order to selectively control a flow rate of the hydraulic fluid in the fluid control passage.

20 Claims, 10 Drawing Sheets

ELECTRO-MAGNETIC ACTUATOR FOR TORQUE COUPLING WITH VARIABLE PRESSURE-CONTROL SPOOL VALVE

BACKGROUND OF THE INVENTION

1. Field of the Invention

The present invention relates to torque coupling assemblies in general, and more particularly to a torque coupling assembly including an electromagnetic actuator controlling a variable pressure-control valve.

2. Description of the Prior Art

Hydraulic couplings are used in various vehicular drivetrain applications to limit slip and transfer drive torque between a pair of rotary members. In all-wheel drive applications, hydraulic couplings are used to automatically control the drive torque transferred from a driven member to a non-driven member in response to speed differentiation therebetween. In limited slip applications, couplings are used in association with a differential to automatically limit slip and bias the torque distribution between a pair of rotary members.

Such hydraulic couplings conventionally use a friction clutch between the rotary members as a limited-slip device. The friction clutch may be selectively actuated by various hydraulic actuator assemblies. The hydraulic actuator assemblies internal to a torque-coupling case often include displacement pumps disposed inside the torque-coupling case and actuated in response to a relative rotation between the torque-coupling case and the output shaft. The displacement pumps are usually in the form of internal gear pumps, such as gerotor pumps adapted to convert rotational work to hydraulic work. In the internal gear pumps, an inner gear having outwardly directed teeth cooperates with an external gear having inwardly directed teeth so that fluid chambers therebetween increase and decrease in volume as the inner and outer gears rotate in a housing.

Pump type hydraulic couplings, such as active limited slip differentials, employ the internal pump to convert the spin speed difference between the one of the output shafts and the differential case to a hydraulic pressure that actuates a piston (hydraulic cylinder), which in turn activates a multi-plate clutch pack. In addition, an electromagnet-activated pressure-relief throttle valve, disposed at a fluid outlet hole of the pump, controls the fluid pressure generated by the pump and thus the torque level of the limited slip device. Prior-art pump type active limited slip differentials are acceptable for low-speed mobility situations (e.g. split-μ hill climb), but they lose its controllability for medium-to-high-speed handling maneuvers. This failure of the pump-type coupling is caused by the fact that fluid inlet and outlet holes positioned at significantly high outer radius of the differential case, resulting in the centrifugal loss/draining of the fluid from the pump and the piston when the differential case is spinning.

The reason for this is that the present pump-type active limited slip differentials employ an annular electromagnet that is oriented upright, i.e. open at its outer radius. An annular armature is disposed at the outer radius of the electromagnet with a small amount of axial position offset. The energized electromagnet axially pulls the armature towards the differential case, choking the pressure-control valve disposed at the outlet hole of the differential case. Such a radial arrangement of the electromagnet and armature in the prior art pump type active limited slip differentials renders no choice but to position the fluid inlet and outlet holes at the radial position equal to or larger than the radius of the armature, which is usually larger than the diameter of the hydraulic pump and the piston. As a result, when the differential case spins in response to the vehicle speed, the hydraulic fluid in the pump and the piston is centrifugally drained through the oil inlet and outlet holes, resulting in the failure of the differential system in terms of time delay and abrupt engagement of the clutch. Therefore, the prior-art pump type active limited slip differentials fail to work for medium-to-high-speed handling maneuvers.

Another disadvantage of the prior-art active limited slip differentials is their use of the pressure-relief throttle valve in the form of a compression-type ball valve or cone valve that requires relatively high actuation force and suffers from a "pressure defeat problem". The "pressure defeat problem" denotes that static pressure and hydrodynamic force open the pressure-relief throttle valve against the electromagnetic force. As illustrated in FIG. 1, an output torque of the torque-coupling assembly of the prior art first increases in a Linear Control Regime as speed differential between the torque-coupling case and the output shaft increases. Then, in a Pressure Defeat regime, the output torque decreases (thus losing torque capacity) as the compression-type ball (or cone) valve is defeated by the rising hydraulic pressure generated by the pump. Finally, the output torque increases again in a Pure Orifice Regime when the compression-type ball valve is fully open (defeated).

Thus, while known hydraulic couplings, including but not limited to those discussed above, have proven to be acceptable for some vehicular driveline applications and conditions, such devices are nevertheless unacceptable for some operational conditions and susceptible to improvements that may enhance their performance and cost. With this in mind, a need exists to develop improved hydraulic torque-coupling assemblies that advance the art.

SUMMARY OF THE INVENTION

The present invention provides an improved electronically controlled torque-coupling assembly. The torque-coupling assembly in accordance with the present invention comprises a rotatable torque-coupling case, at least one output shaft drivingly operatively connected to the torque-coupling case, a friction clutch assembly for selectively engaging and disengaging the torque-coupling case and the output shaft, a hydraulic pump for generating a hydraulic fluid pressure to frictionally load the clutch assembly, a fluid control passage through which a hydraulic fluid is discharged from the torque-coupling case, and a variable pressure-control valve assembly to selectively control the clutch assembly.

The variable pressure-control valve assembly includes a spool valve disposed in the fluid control passage and an electromagnetic actuator. The electromagnetic actuator is provided for producing a variable axial electromagnetic force acting to the spool valve so as to selectively adjust a position of the spool valve in the fluid control passage in order to selectively control a flow rate of the hydraulic fluid in the fluid control passage.

Therefore, the electronically controlled torque-coupling assembly in accordance with the present invention is provided with an electro-magnetic actuator for activating a variable pressure-control valve for allowing continuously variable torque coupling and distribution. The spool valve requires smaller valve actuation force when compared to compression type valves of the prior art, thus less amount of electric power needed to control the torque-coupling assembly, and provides more accurate pressure control.

BRIEF DESCRIPTION OF THE DRAWINGS

Other objects and advantages of the invention will become apparent from a study of the following specification when viewed in light of the accompanying drawings, wherein.

DETAILED DESCRIPTION OF PREFERRED EMBODIMENTS

Figure 1:
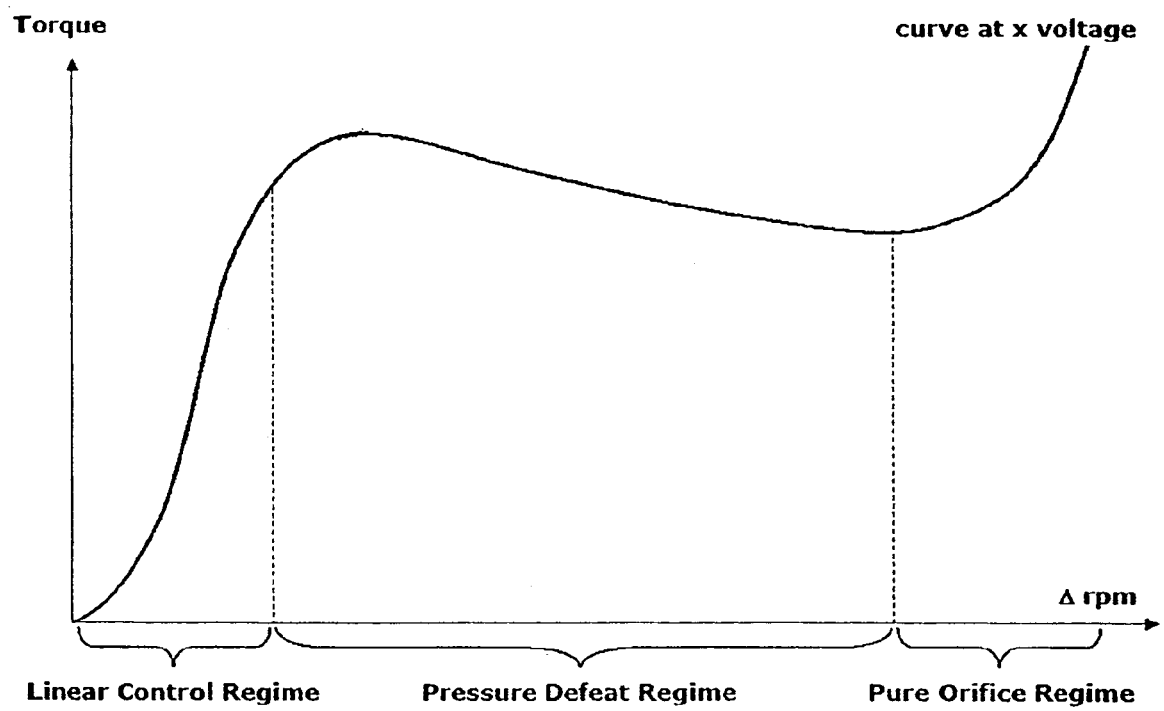
FIG. 1 shows a typical torque characteristic of a torque-coupling assembly of the prior art having a variable pressure-relief valve assembly with a compression-type throttle valve.

The preferred embodiment of the present invention will now be described with the reference to accompanying drawings.

For purposes of the following description, certain terminology is used in the following description for convenience only and is not limiting. The words "right," "left," "lower," and "upper" designate directions in the drawings to which reference is made. The words "outermost" and "innermost" refer to position in a vertical direction relative to a geometric center of the apparatus of the present invention and designated parts thereof. The terminology includes the words above specifically mentioned, derivatives thereof and words of similar import. Additionally, the word "a," as used in the claims, means "at least one."

Figure 2:
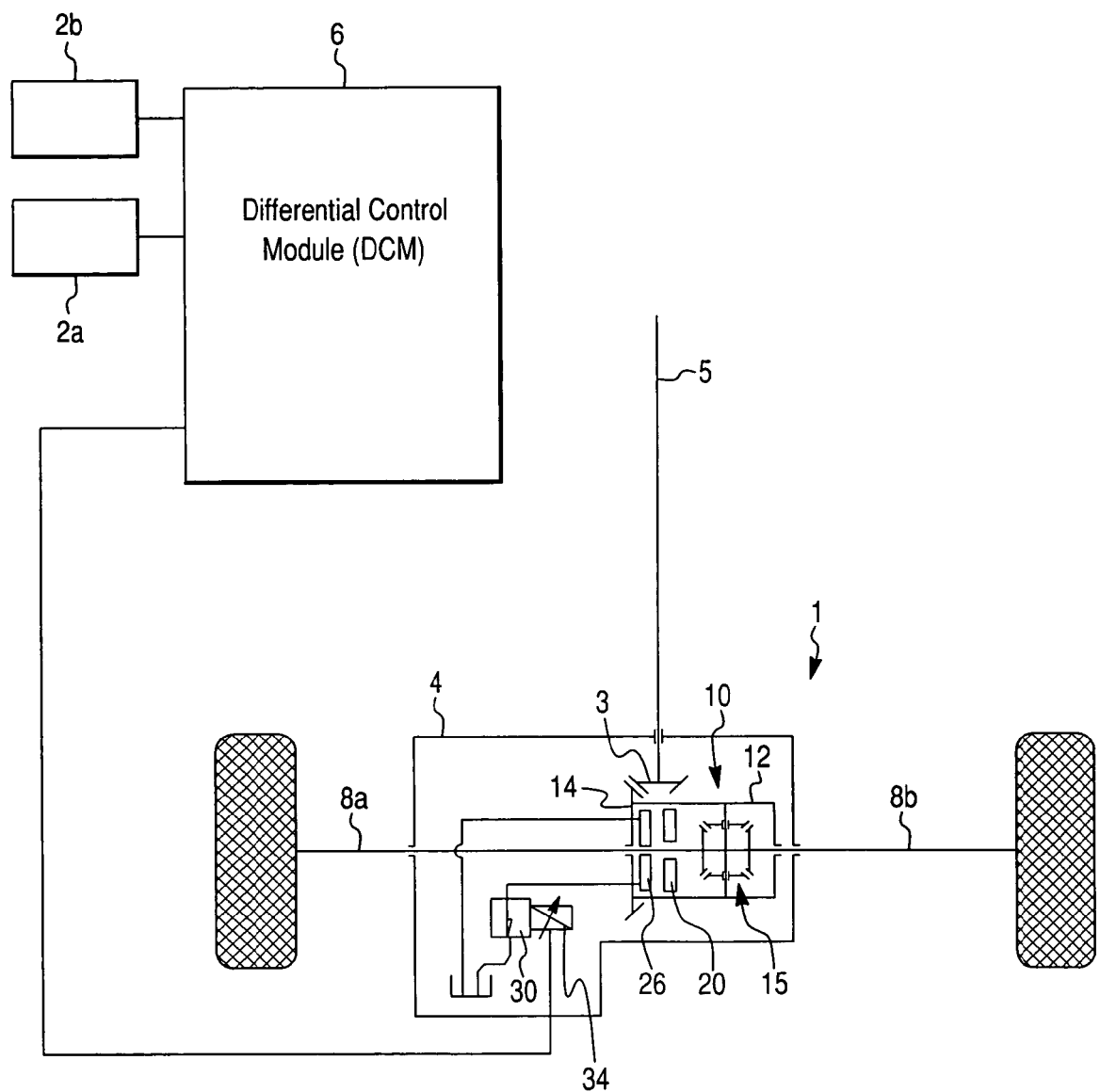
FIG. 2 is a schematic diagram of a drive axle assembly of a motor vehicle including an electronically controlled torque-coupling assembly in accordance with the present invention.
Figure 3:
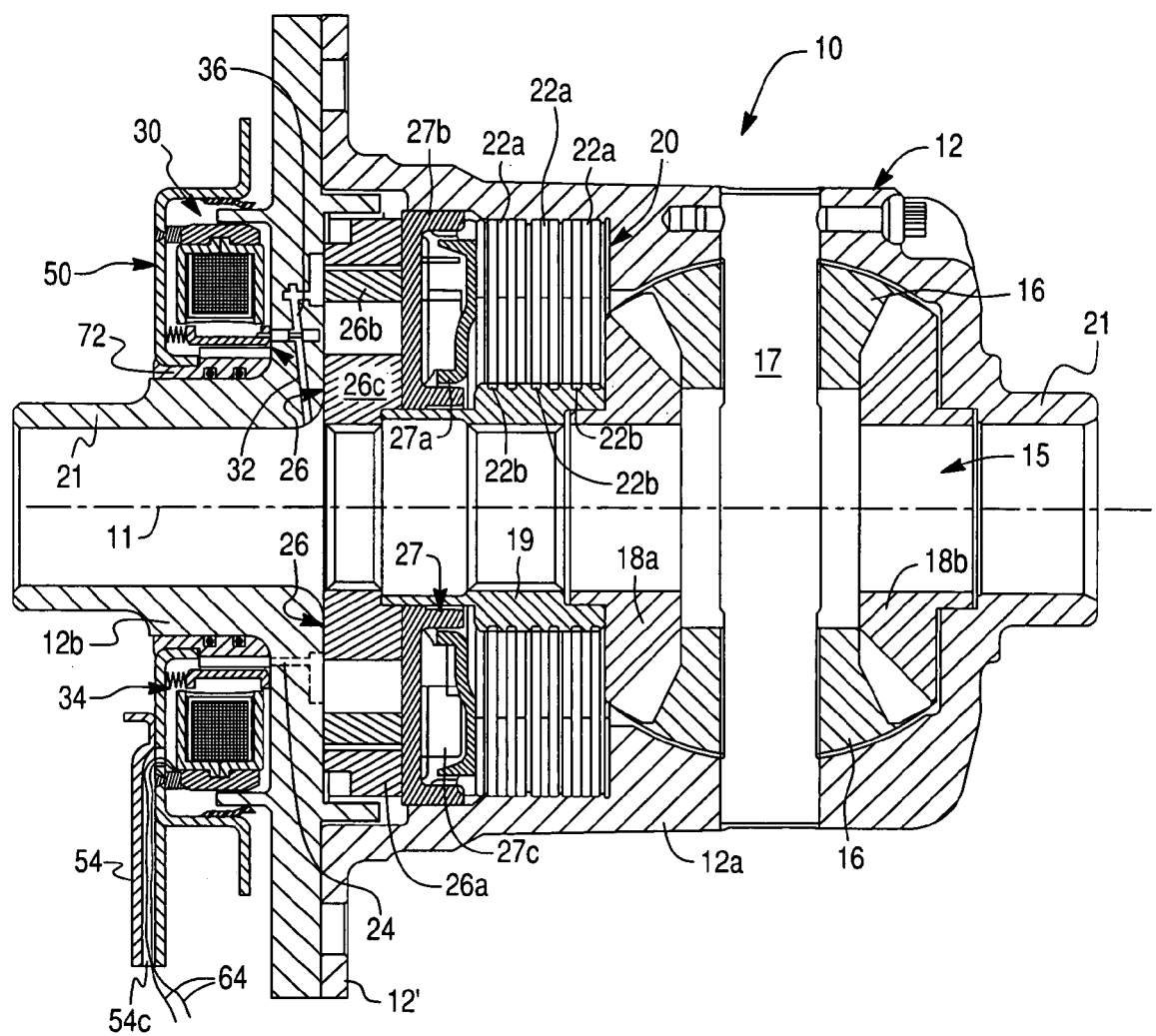
FIG. 3 is a sectional view of the torque-coupling assembly according to the preferred embodiment of the present invention.

The present invention is directed to a hydraulically actuated torque coupling assembly including a hydraulic fluid pump, such as a hydraulically controlled limited slip differential (LSD) assembly indicated generally at 10 in FIGS. 2 and 3 that illustrate the preferred embodiment of the present invention. It will be appreciated that the hydraulically actuated torque coupling assembly of the present invention may be in any appropriate form other than the limited slip differential assembly, such as hydraulically actuated shaft coupling, auxiliary axle coupling for a motor vehicle, a power take-off coupling of a front-wheel-drive transaxle, etc.

FIG. 2 schematically depicts a rear wheel drive axle assembly 1 including the differential assembly 10. The differential assembly 10 comprises a differential case (or a coupling case) 12 rotatably supported within a differential housing (or a coupling housing) 4 and driven by a drive pinion gear 3 transmitting a drive torque from an engine (not shown) to a ring gear 14 through a propeller shaft 5. A differential gear mechanism 15 disposed within the differential case 12 is operatively coupled to output axle shafts 8a and 8b for allowing differential rotation thereof. As further shown in FIGS. 2 and 3, the differential assembly 10 is provided with a hydraulic coupling which is responsive to differences in rotations between the output axle shafts 8a, 8b. The hydraulic coupling comprises a friction clutch assembly 20 and an actuator assembly operably arranged to actuate the clutch assembly 20 for automatically and progressively transferring drive torque from the faster rotating axle shaft to the slower rotating axle shaft in response to excessive speed differentiation therebetween. The actuator assembly includes a hydraulic fluid pump 26, a piston assembly 27, and a variable pressure-control valve assembly 30 for selectively controlling a discharge pressure of the pump 26 and, subsequently, the clutch assembly 20. Preferably, the clutch assembly 20 is a hydraulically actuated multi-plate friction clutch assembly. However, other appropriate types of hydraulically actuated clutches are within the scope of the present invention. The hydraulic fluid pump 26 provides pressurized hydraulic fluid for actuating the clutch assembly 20. Both the actuator assembly and the clutch assembly 20 are disposed within the differential case 12.

The variable pressure-control valve assembly 30 is operated by an electro-magnetic (preferably, solenoid) actuator, electronically controlled by a differential control module (DCM) 6 based on one or more vehicle parameters 2a as control inputs, such as a vehicle speed, a wheel speed difference, vehicle yaw rate, a vehicle lateral acceleration, a steering angle, an engine throttle position, a brake application, an ice detection, a moisture detection, a vehicle driveline configuration and a yaw stability control system actuation, and a programmable control mechanism could be used to interface with the hydraulic actuated limited slip differential. The DCM 6 is also connected to a source of an electric power supply, such as an electric storage battery 2b mounted on the motor vehicle.

When energized, solenoid-operated valve assembly 30 is capable of modulating a pump discharge pressure in a variable range from a minimum pressure to a maximum pressure, thereby variably controlling a drive torque distribution between the output axle shafts 8a and 8b in a range from a minimum torque value to a maximum torque value. For example, the yaw stability control actuation may be actuated when the vehicle yaw rate reaches a predetermined level. At this same yaw rate, the variable pressure-control valve assembly 30 will be actuated to disengage the limited slip feature of the LSD assembly 10.

When the vehicle yaw rate falls below the predetermined level, the limited slip feature can be turned back "ON". Another vehicle parameter which could be effectively used in this manner is the steering angle. This could be sensed to determine if the limited slip feature is needed. At ranges from small to no steering angle the limited slip feature can be made available and then disengaged at larger steering angles. Either of these methods could also be combined with the previously mentioned method of optimizing the amount of limited slip available between an "ON" and "OFF" position by monitoring differences in wheel RPM or speed.

FIG. 3 of the drawings illustrates in detail the preferred arrangement of the differential assembly 10 in accordance with the present invention. The differential case 12 includes a case member 12a and a side cover member 12b each provided with a complementary annular flange. The flanges of the case member 12a and the side cover member 12b are fastened to each other by any appropriate means known in the art, such as threaded fasteners (not shown), to form a generally cylindrical structure and define a flange 12'. The differential case 12 also includes hollow receiving hubs (trunnions) 21 on each end thereof. The hubs 21 define apertures for receiving opposite output shafts 8a, 8b. The differential case 12 is rotatably supported in the differential housing 4 (shown only schematically in FIG. 2) for rotation about a central axis 11 through differential bearings (not shown) mounted about the hubs 21. The differential housing 4 forms a differential chamber containing a supply of a hydraulic lubricant fluid, thus defining a hydraulic fluid reservoir.

The ring gear 14 (shown in FIG. 2) is bolted or other wise secured to the differential case 12 at the flange 12'. The differential gear mechanism 15 disposed within the differential case 12 includes a set of pinion gears 16 rotatably supported on a pinion shaft 17 secured to the differential case 12. The pinion gears 16 engage a pair of opposite side gears 18a and 18b adapted to rotate about the axis 11. The side gears 18a and 18b are splined to the output axle shafts 8a and 8b respectively. Disposed adjacent the side gear 18a is an inner clutch sleeve 19 having external splines and drivingly coupled to the associated axle shaft 8a.

The friction clutch assembly 20 is a limited slip device provided within the differential case 12. The friction clutch assembly 20, well known in the prior art, includes at least one outer friction plate 22a and at least one inner friction plate 22b. Typically, the friction clutch assembly 20 includes sets of alternating outer friction plates 22a and inner friction plates 22b. Conventionally, an outer circumference of the outer friction plates 22a is provided with projections that non-rotatably engages corresponding grooves formed in the differential case 12. Similarly, an inner circumference of the inner friction plates 22b is provided with projections that non-rotatably engage corresponding grooves formed in the clutch sleeve 19, which in turn is splined to the associated axle shaft 8a. At the same time, both the outer friction plates 22a and the inner friction plates 22b are slideable in the axial direction. The clutch plates 22a frictionally engage the clutch plates 22b to form a torque coupling arrangement between the differential case 12 and the differential mechanism 15 formed by the pinion gears 16 and side gears 18a, 18b. Torque is transferred from a ring gear (not shown) to the differential case 12, which drives the differential mechanism 15 through the pinion shaft 17.

When the friction clutch assembly 20 is actuated by the hydraulic clutch actuator assembly, the outer clutch plates 22a frictionally engage the inner clutch plates 22b to form a torque coupling between the differential case 12 and the output shaft 8a. As described below, the hydraulic pump 26 actuates the friction clutch assembly 20 depending on the relative rotation between the differential case 12 and the clutch sleeve 19, i.e. the axle shaft 8a. More specifically, the speed sensitive fluid pump 26 actuates the piston assembly 27 that compresses (axially loading) the friction clutch assembly 20 to increase the frictional engagement between the clutch plates 22a and 22b.

The speed sensitive hydraulic pump 26 disposed within the differential case 12 actuates the clutch assembly 20 when the relative rotation between the output axle shafts 8a and 8b occurs. It will be appreciated that a hydraulic pressure generated by the pump 26 is substantially proportional to a rotational speed difference between the output axle shafts 8a and 8b. In the preferred embodiment, the hydraulic displacement pump 26 is a speed sensitive, bi-directional gerotor pump. The gerotor pump 26 includes a pump cylinder 26a, an outer rotor 26b, and an inner rotor 26c. The inner rotor 26c drivingly coupled to the output axle shaft 8a, and the pump cylinder 26a is secured to the differential case 12. The inner rotor 26c has one less tooth than the outer rotor 26b and when the inner rotor 26c is driven, it will drive the outer rotor 26b, which can freely rotate within the pump cylinder 26a eccentrically with respect to the inner rotor 26c, thus providing a series of decreasing and increasing volume fluid pockets by means of which fluid pressure is created. Therefore, when relative motion takes place between differential case 12 and the output axle shaft 8a, i.e. between the output axle shafts 8a and 8b, the gerotor pump 26 generates hydraulic fluid pressure. However, it will be appreciated that any other appropriate type of hydraulic pump generating the hydraulic pressure in response to the relative rotation between the differential case 12 and the output axle shaft 8a is within the scope of the present invention.

The piston assembly 27 including a hydraulically actuated piston 27a disposed within a piston housing 27b, serves to compress the clutch pack 20 and retard any speed differential between the side gear 18a and the differential case 12. This results in a retardation of any speed differential between the axle shafts 8a and 8b. Pressurized hydraulic fluid to actuate the piston 27a and engage the clutch pack 20 is provided by the gerotor pump 26. In such an arrangement, when a speed difference between the output shafts 8a, 8b exists, the hydraulic fluid is drawn into the pump 26 through a suction passage 24. The gerotor pump 26 pumps the pressurized fluid into a piston pressure chamber 27c defined between the piston 27a and the piston housing 27b to actuate the clutch pack 20. As the speed difference increases, the pressure increases. The pressurized fluid in the piston pressure chamber 27c creates an axial force upon the piston 27a for loading the clutch pack 20, which is further resisted by the friction plates 22a and 22b. The loading of the clutch pack 20 allows for a torque transfer distribution between the axle shafts 8a and 8b.

The torque coupling assembly 10 further comprises a non-rotatable hydraulic fluid plenum plate 50. As illustrated in detail in FIG. 4, the plenum plate 50 is rotatably mounted to the side cover member 12b of the differential case 12 so as to form an annular, fluidly sealed hydraulic plenum chamber 51 defined between the plenum plate 50 and the differential case 12. More specifically, the plenum plate 50 is stationary relative to the differential housing 4, while the differential case 12 is rotatable relative thereto. The plenum plate 50 includes a pickup tube 54 for supplying the hydraulic fluid from the hydraulic fluid reservoir 4 to the plenum chamber 51. The pickup tube 54 has an inlet end 54a and an outlet end 54b. The inlet end 54a of the pickup tube 54 is provided with an inlet opening 54c submerged in the hydraulic lubricant fluid in the hydraulic fluid reservoir 4. In turn, the outlet end 54b of the pickup tube 54 is provided with an outlet opening 59 fluidly connecting the pickup tube 54 with the plenum chamber 51. The plenum plate 50 is substantially circular in configuration and includes an annular outer flange 60 and an annular inner flange 62 defining a central opening therethrough.

Figure 4:
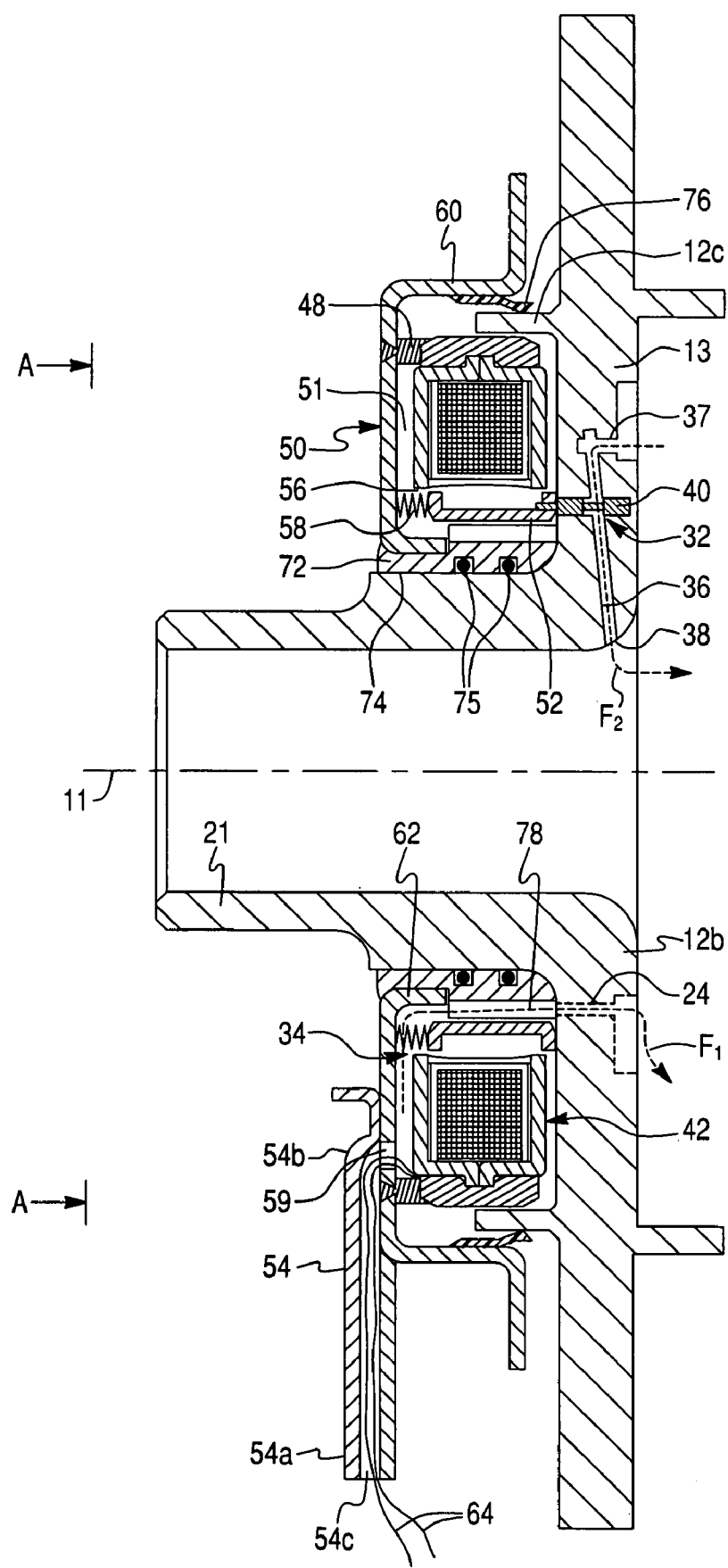
FIG. 4 is an enlarged cross-sectional view of a variable pressure-control valve assembly of the present invention mounted to a coupling case of the torque-coupling assembly showing a pressure-control spool valve in an open position.

Moreover, as illustrated in detail in FIG. 4, the LSD assembly 10 according to the preferred embodiment of the present invention is provided with an annular bushing 72 non-rotatably secured to the inner flange 62 of the plenum plate 50. In turn, the bushing 72 is rotatably mounted to the hub 21 of the differential case 12. The bushing 72 is made of any appropriate non-magnetic material, such as plastic material. Preferably, the plastic bushing 72 is molded over the inner flange 62 of the plenum plate 50. A central bore 74 of the plastic bushing 72 is provided with an inner seal in the form of at least one O-ring seal 75 in sealing contact with the hub 21 of the differential case 12. The outer flange 60 axially extends from the plenum plate 50 toward the differential case 12 and is further provided with an annular outer lip seal 76 adapted to engage an outer peripheral surface of an annular flange 12c extending axially outwardly from the side cover member 12b of the differential case 12. Thus, the inner and outer seals 75 and 76, respectively, fluidly seal the plenum chamber 51 between the plenum plate 50 and the side cover member 12b of the coupling case 12.

As further shown in FIGS. 3 and 4, the side cover member 12b of the differential case 12 has at least one, preferably more than one, inlet hole (or port) 24 through which the hydraulic fluid is drawn into the hydraulic fluid pump 26 from the plenum chamber 51 (depicted by the reference mark $F_1$ in FIG. 4), and at least one fluid control passage 36 through which the hydraulic fluid exits the differential case 12 and into the coupling housing 4 (depicted by the reference mark $F_2$ in FIG. 4). Preferably, the inlet hole 24 and the fluid control passage 36 are formed in a wall 13 of the side cover member 12b of the differential case 12. The fluid control passage 36 is in fluid communication with the piston pressure chamber 27c through an outlet hole 37 formed in the differential case 12. The hydraulic fluid leaves the fluid control passage 36 through an exit opening 38 provided at a radially innermost end of the fluid control passage 36. In other words, the hydraulic fluid released from the differential case 12 enters the fluid control passage 36 through the outlet hole 37 and leaves the fluid control passage 36 through the exit opening 38, as illustrated in FIG. 4 by the reference mark $F_2$. Preferably, the inlet and outlet holes 24 and 37, respectively, and the exit opening 38 are formed on radii as close to the central axis 11 as possible so as to eliminate the centrifugal hydraulic fluid loss problem of the prior-art pump-type torque-coupling systems. Further preferably, the inlet and outlet 24 and 37, and the fluid control passage 36 are formed in the side cover member 12b of the differential case 12 by drilling. Alternatively, the holes 24 and 36 could be formed by casting, or any other appropriate method known in the art.

In order to control the fluid pressure in the piston pressure chamber 27c and, subsequently, the output torque distribution of the limited slip differential assembly, the variable pressure-control valve assembly 30 is provided. The variable pressure-control valve assembly 30 according to the present invention, illustrated in detail in FIG. 4, is in the form of an electro-magnetic valve assembly and comprises a pressure-control valve 32 controlled by an electromagnetic actuator 34 that may be any appropriate electro-magnetic device well known in the art, such as solenoid.

The pressure-control valve 32 according to the present invention is a spool valve that comprises a spool member 40 disposed in a valve chamber (or valve bore) 39 for sliding movement therewithin. The valve chamber 39 is formed in the wall 13 of the side cover member 12b of the differential case 12 across the fluid control passage 36. In other words, the valve chamber 39 is in fluid communication with the fluid control passage 36. Preferably, the valve chamber 39 is substantially cylindrical in cross-section and is formed as a dead-ended drill hole in the differential case side cover member 12b from an axially outer face thereof. The fluid control passage 36 is drilled across a central portion of the valve chamber 39. The outlet hole 37 is drilled in the differential case side cover member 12b from an inner face thereof as another dead-ended hole through the fluid control passage 36, thus fluidly connecting the fluid control passage 36 with the piston pressure chamber 27c.

Figure 8:
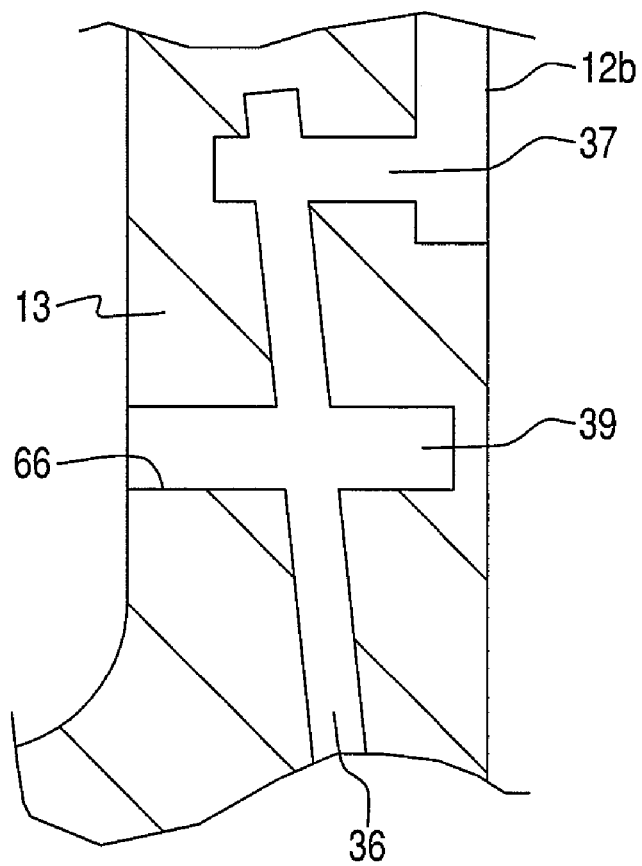
FIG. 8 is an enlarged cross-sectional view of a side cover member of the coupling case of the torque-coupling assembly without the pressure-control spool valve.
Figure 9:
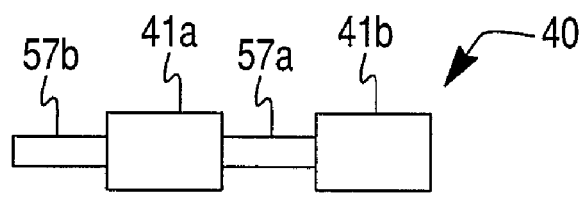
FIG. 9 is an enlarged side view of a spool member of the pressure-control spool valve.

The spool member 40, illustrated in detail in FIG. 9, includes two substantially cylindrical land portions 41a and 41b axially spaced by a central portion (or valve stem) 57a of a reduced size relative to the land portions 41a and 41b. The land portions 41a and 41b of the spool member 40 slidingly engage a complementary inner peripheral surface 66 of the valve chamber 39 (shown in FIG. 8). The spool member 40 further includes a connecting portion (or shaft) 57b axially extending therefrom. The connecting portion 57b is provided for mounting the spool member 40 to the electro-magnetic actuator 34.

Figure 5:
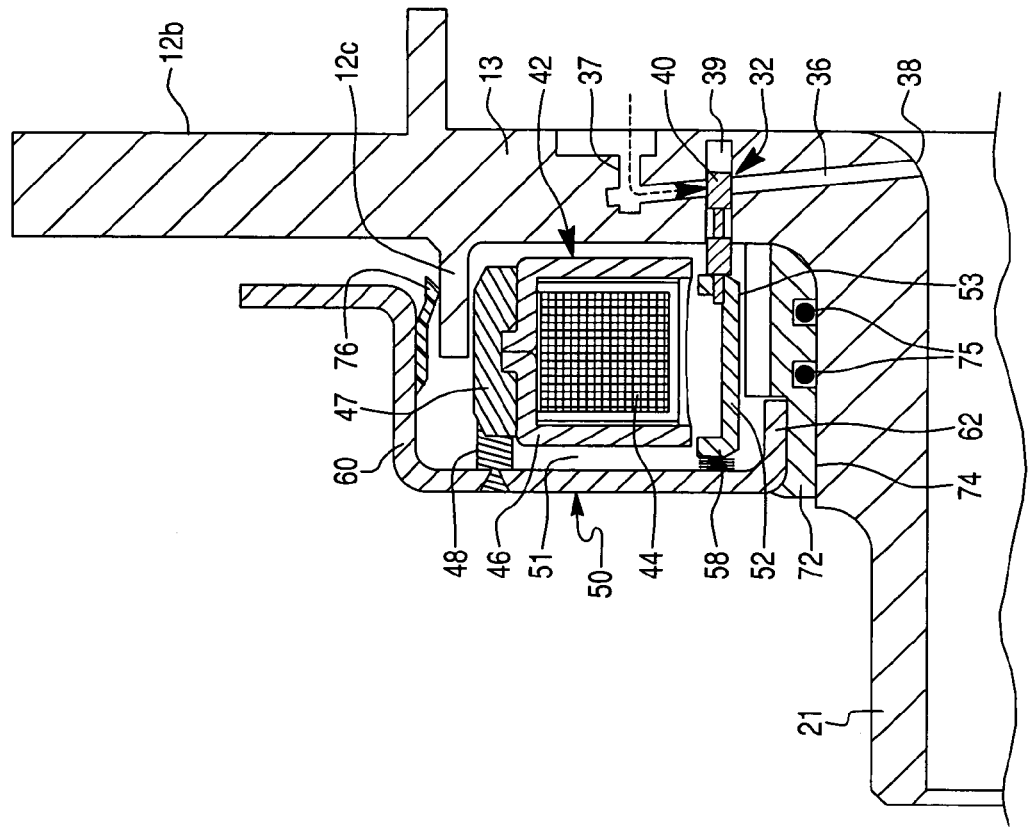
FIG. 5 is a partial enlarged cross-sectional view of the variable pressure-control valve assembly of the present invention showing a pressure-control spool valve in the open position.
Figure 6:
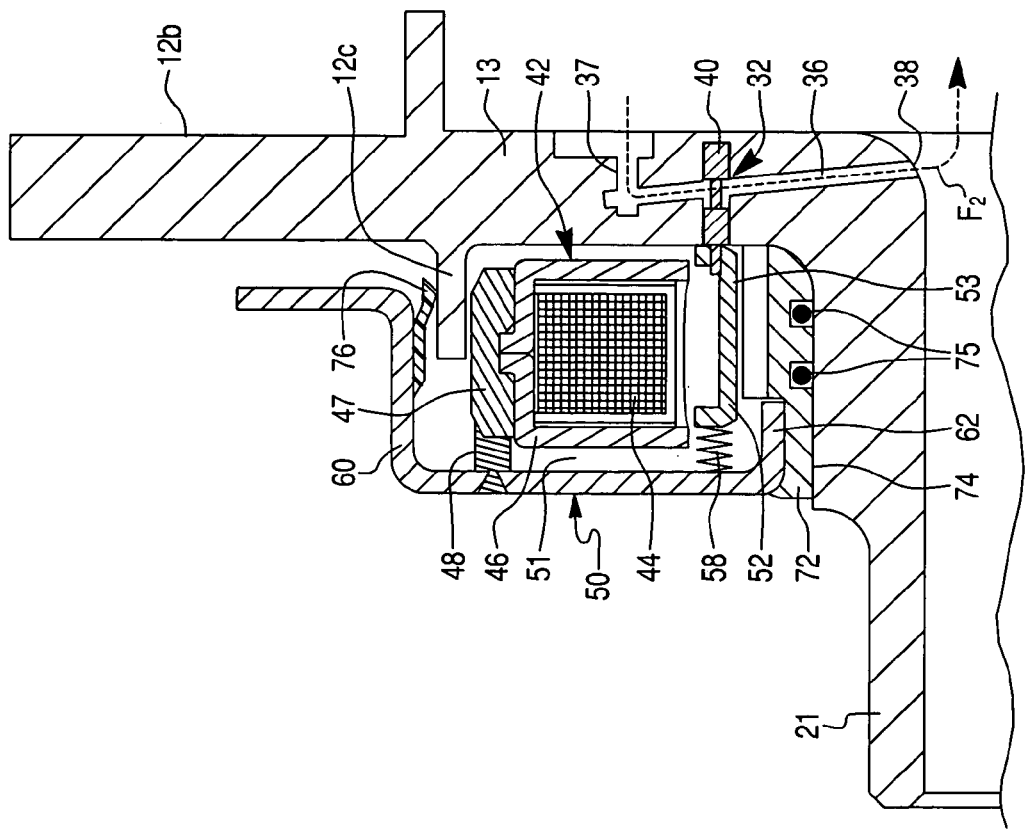
FIG. 6 is a partial enlarged cross-sectional view of the variable pressure-control valve assembly of the present invention showing a pressure-control spool valve in a closed position.
Figure 7:
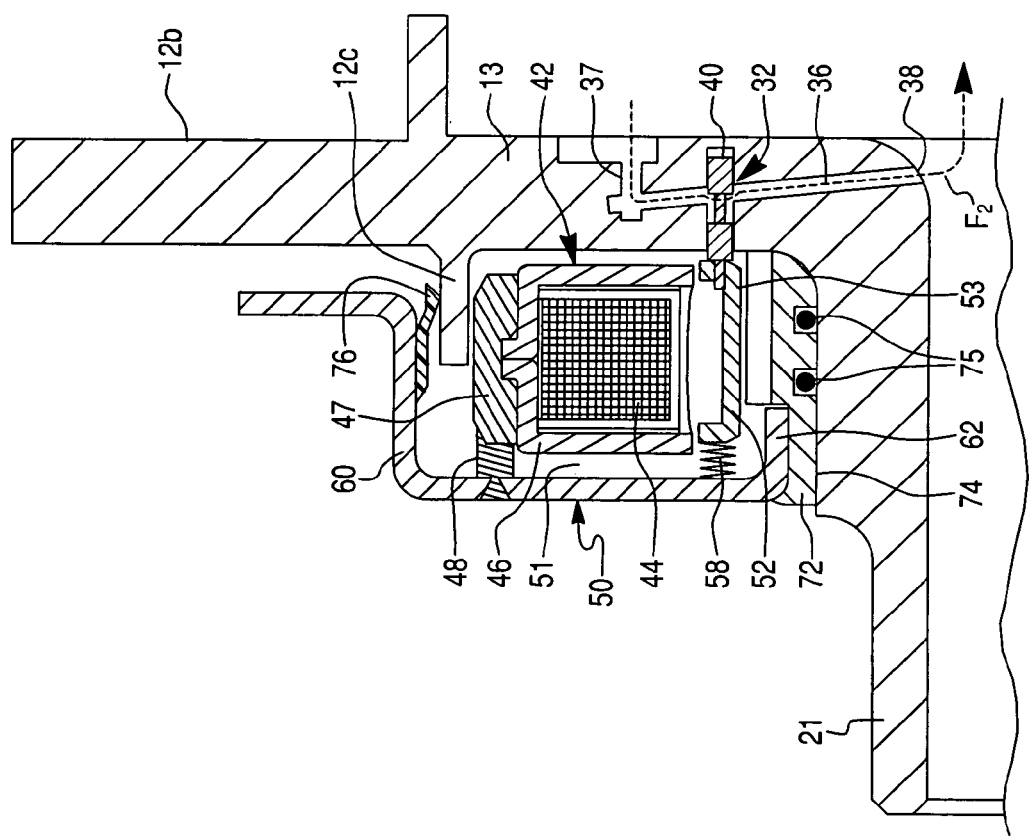
FIG. 7 is a partial enlarged cross-sectional view of the variable pressure-control valve assembly of the present invention showing the pressure-control spool valve in a partially closed position.

The spool member 40 of the spool valve 32 is axially movable within the valve bore 39 by the electro-magnetic actuator 34 between a closed position when the land portion 41b of the spool member 40 blocks the fluid control passage 36 (as shown in FIG. 6), and an open position thereof when the reduced diameter central portion 57a of the spool member 40 is axially registered with the fluid control passage 36 so as to allow hydraulic fluid in the fluid control passage 36 freely flow through the spool valve 32 across the spool member 40 (as shown in FIGS. 4 and 5). FIG. 7 shows the spool valve 32 in a partially closed position (i.e. between open and closed positions) so that the spool member 40 partially blocks the fluid control passage 36.

As best shown in FIGS. 3 and 4, the electro-magnetic actuator 34 is disposed in the plenum chamber 51. The electromagnetic actuator 34 is also rotatably mounted to the differential case 12 through the plastic bushing 72. The electro-magnetic actuator 34 comprises an inverted, annular electromagnetic coil (or solenoid) assembly 42 and an annular armature 52 axially movable in the direction of the axis 11.

Figure 10:
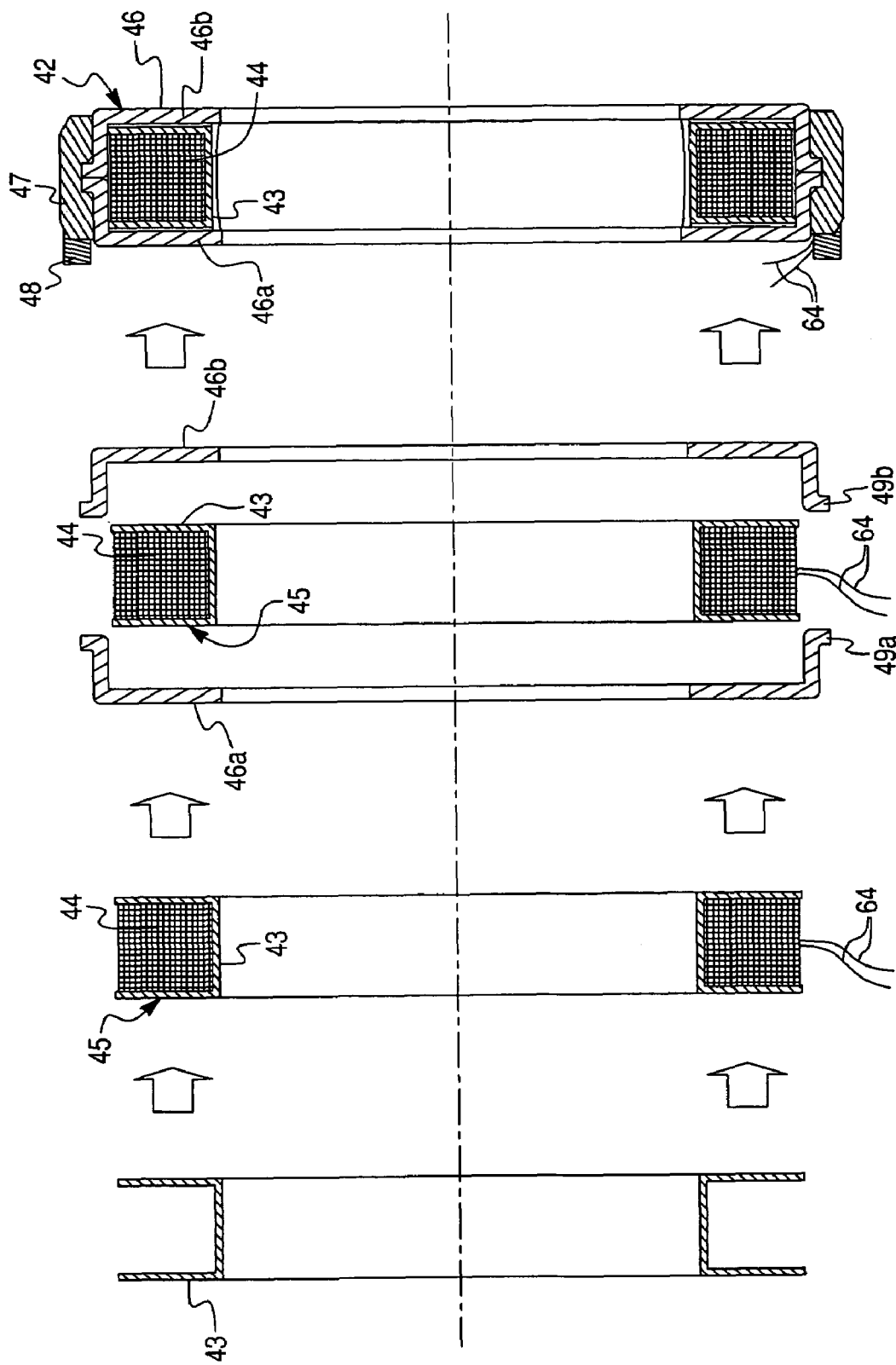
FIG. 10 shows structure and method for manufacturing of an inverted electro-magnetic coil assembly according to the preferred embodiment of the present invention.

As further shown in detail in FIG. 10, the inverted electromagnetic coil assembly 42 comprises an annular plastic bobbin 43 having a substantially U-shaped cross-section, a coil wire 44 wound on the bobbin 43 to define a coil winding 45, two generally identical annular half-piece coil housing members 46a and 46b inclosing the coil winding 45 therebetween so as to form a coil housing 46, and an annular lock member 47 interlocking the two half-piece coil members 46a and 46b so as to form a coil housing 46. Preferably, the bobbin 43 is open at its outer radius. Electrical current is supplied to the coil wire 44 through supply wires 64 from any appropriate source, such as an electrical battery. Preferably, as shown in FIGS. 2 and 3, the supply wires 64 connected to the coil wire 44 are laid in the pickup tube 54 and reach the coil wire 44 through the outlet opening 59 of the pickup tube 54. Each of the coil housing members 46a and 46b is formed of a single-piece magnetically permeable material, such as conventional ferromagnetic materials. Alternatively, the coil housing members 46a and 46b may be formed of a plurality of laminations of the magnetically permeable material. Preferably, the coil assembly 42 is non-rotatably mounted to the plenum plate 50 substantially coaxially to the axis 11 by a retainer member 48 fastening the lock member 47 to the plenum plate 50. Consequently, the coil assembly 42 is non-rotatable relative to the differential housing 4, while the differential case 12 is rotatable relative to the coil assembly 42. This inverted radial arrangement of the electromagnetic coil assembly 42 allows the inlet hole 24 and the outlet hole 36 be positioned at a smaller radial location, than with the upright radial arrangement of the electromagnetic coil assembly, for effectively eliminating the centrifugal hydraulic fluid loss problem.

The inverted electro-magnetic coil assembly 42 is manufactured as follows. First, the plastic, channel-shaped bobbin 43 is provided. Then, the coil wire 44 is wound around the bobbin 43 by spinning the plastic bobbin 43 to form the coil winding 45. Subsequently, the two half-piece coil housing members 46a and 46b are slid axially onto the coil winding 45 so as to enclose the coil winding 45 therebetween. Finally, the two half-piece coil housing members 46a and 46b are secured together so as to form the coil housing 46. Preferably, the two half-piece coil housing members 46a and 46b are interlocked by the lock member 47. More preferably, the lock member 47 is made of a plastic material which over-molded along an outer peripheral surface of the coil housing 46 for positively locking the two coil housing members 46a and 46b together. Specifically, the plastic lock member 47 is over-molded over annular connecting flanges 49a and 49b of the coil housing members 46a and 46b, respectively, thus interlocking the coil housing members 46a and 46b. However, other materials should be considered within the scope of the invention.

Therefore, the plenum plate 50, the electromagnetic coil assembly 42, the lip seal 76, and the bushing 72 with the seals 75 form a single sub-assembly, facilitating the assembly process of the LSD assembly 10.

The armature 52 is disposed radially inwardly of the electro-magnetic coil assembly 42 substantially coaxially thereto. Moreover, the armature 52 is radially spaced from the electro-magnetic coil assembly 42, thus defining an air gap 56. The spool member 40 of the spool valve 32 is securely attached to the armature 52 by any appropriate manner known in the art. Preferably, the connecting portion 57b axially extending from the spool member 40 is press-fit at an axially inner face of the armature 52 (as illustrated in FIG. 4). Alternatively, the spool member 40 may be integrally formed with the armature 52 as a single-piece part.

A preloaded spring 58, such as wave spring or coil spring, is operatively disposed between the plenum plate 50 and an axially outer face of the armature 52 for urging the spool member 40 rightward (as shown in FIG. 4) toward the differential case 12 to the open position of the spool valve 32. In other words, the pressure-control spool valve 32 defines a normally-open valve.

As further shown in FIGS. 2-6, the annular armature 52 is mounted about the bushing 72 which supports the armature 52 within the electromagnetic coil assembly 42 for axial movement in the direction of the axis 11. In other words, the bushing 72 is disposed in a bore 53 in the armature 52 for guiding the axial movement of the armature 52. Preferably, the armature 52 is non-rotatably mounted to the side cover member 12b of the differential case 12, forcing the armature 52 to rotate together with the differential case 12.

Figure 11:
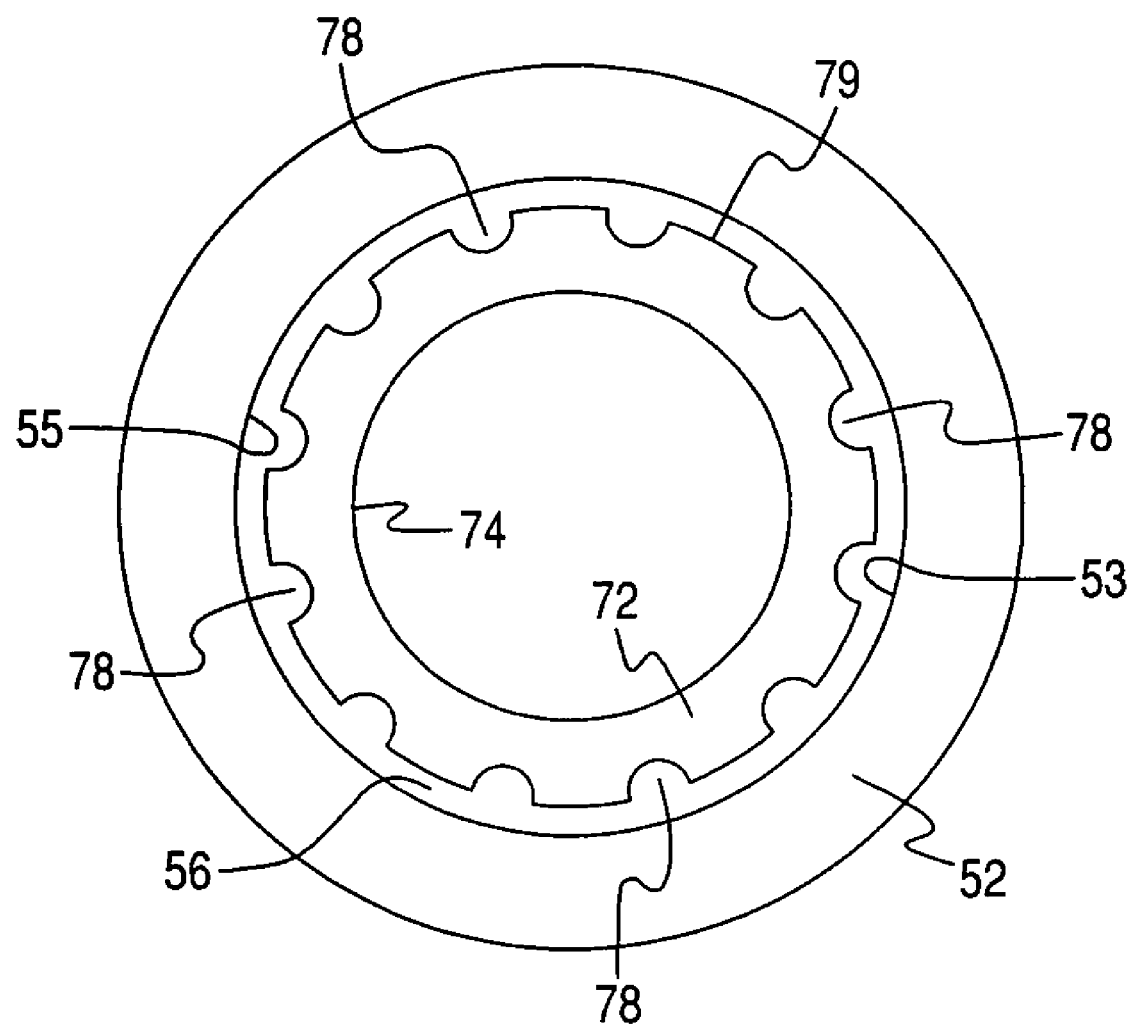
FIG. 11 is a plan view of a bushing member and an armature in the direction of arrows A-A in FIG. 4.

Furthermore, a plenum passage is provided adjacent to a radially inner peripheral surface 55 of the armature 52 (shown in detail in FIGS. 4-7 and 11) for allowing fluid communication through the electromagnetic actuator 34. More specifically, as further shown in FIG. 11, the bushing 72 is provided at least one, preferably a set of circumferentially distributed axial grooves, or passageways, 78 formed at its outer peripheral surface 79 thereof to allow flow of the hydraulic fluid between the armature 52 and the bushing 72 therethrough. Alternatively, the passageways 78 may be formed within material of the bushing 72. The axial grooves 78 define the plenum passage adjacent to both the inlet hole 24 and the outlet hole 36 and allowing for a fluid communication between the plenum chamber 51 and both the inlet hole 24 and the outlet hole 36. More specifically, the plenum passage 78 provides fluid communication between the outlet opening 59 of the pickup tube 54 and the inlet and outlet holes 24 and 37, respectively. In other words, as hydraulic fluid exits the differential case 12, it flows through the plenum passage 78 of the bushing 72. Alternatively, the axial grooves 78 may be formed in the armature 52 at a peripheral surface of the bore 53 thereof. Preferably, the axial grooves 78 have a generally semi-circular cross-section. It will be appreciated that any other appropriate cross-section of the axial grooves 78 will be within the scope of the present invention.

It will be appreciated by those skilled in the art that the armature 52 may have any appropriate shape in the cross-section. Preferably, as illustrated in the exemplary embodiment of FIG. 4, the armature 52 has a generally U-shaped cross-section with magnetic poles facing the coil winding 45, similar to those used in reluctance electric motors. Moreover, the mutual geometric arrangement of the armature 52 and the coil housing members 46a and 46b is such as to provide an increasing axial force applied upon the spool member 40 by the electro-magnetic actuator 34 as it moves from its open to closed position. This is achieved by maintaining a proper axial position "off-set" between the armature 52 and the coil housing members 46a and 46b (and, consequently, the coil winding 45). The term "off-set" is determined here as an amount of misalignment between the armature 52 and the coil housing members 46a and 46b in an axial direction, or a distance between an outward face of one of the coil housing members 46a and 46b and an outward face of the armature 52 in the direction of the central axis 11, as shown in FIG. 4.

In operation, when the rotational speed difference between the output axle shafts 8a and 8b occurs, the hydraulic pump 26 is activated to draw the hydraulic fluid from the hydraulic fluid reservoir (differential housing) 4 through the pickup tube 54 into the plenum chamber 51, then from the plenum chamber 51 into the hydraulic pump 26 through the plenum passage 78 and the inlet hole 24.

On the other hand, when no electrical current or a minimum current is supplied to the coil wire 44 of the electromagnetic coil assembly 42, the spring 58 urges the spool member 40 rightward (as shown in FIGS. 4 and 5) setting the spool valve 32 in the open position. Consequently, the hydraulic fluid flow generated by the pump 26 freely exits the differential case 12 via the outlet hole 37 and the fluid control passage 36 through the open spool valve 32. In this configuration, the hydraulic pressure which can be obtained in the piston pressure chamber 27c of the piston assembly 27 is not high enough to engage the clutch assembly 20, essentially disabling the limited slip feature of the hydraulic LSD assembly 10 without affecting the differential capability. In other words, if no electrical current or a minimum current is supplied to the electromagnetic coil assembly 42, the LSD assembly 10 is in a fully open condition.

As best shown in FIGS. 3-7, when electrical current is supplied to the coil wire 44, a magnetic flux is caused to flow through the armature 52. The magnetic flux creates an electro-magnetic force that axially displaces the armature 52 relative to the electro-magnetic coil assembly 42. The armature 52 selectively displaces the spool member 40 leftward, away from the differential case 12 against the compressing force of the spring 58 with a predetermined axial magnetic force that is a function of the electrical current supplied to the coil wire 44 (as shown in FIGS. 6 and 7). Thus, the displacement of the armature 52 is determined by the balancing of the electromagnetic force generated by the electromagnetic actuator 34 and the compressing force of the spring 58. It will be appreciated by those skilled in the art that the spool member 40 will move until the axial magnetic force larger than the axial compressing force of the spring 58 exerted to the armature 52 by the magnetic flux generated by the coil wire 44, thereby pulling the spool member 40 leftward, away from the differential case 12 and out of the open position and toward its closed position. In such a position, the spool member 40 mounted to the armature 52, at least partially closes the fluid control passage 36 in proportion to its displacement, choking the hydraulic fluid flow through the fluid control passage 36, thus increasing the fluid pressure generated by the hydraulic pump 26. In this manner, by adjusting the electric current supplied to the electromagnetic actuator 34, the fluid pressure to the piston assembly 27 can be controlled.

Therefore, such an arrangement creates the pressure-control valve assembly 30 which regulates a magnitude of hydraulic pressure in the piston pressure chamber 27c that is a function of the current supplied to the coil wire 44. Thus, the variable pressure-control valve assembly 30 selectively sets the hydraulic pressure generated by the hydraulic pump 26 based on the magnitude of the electrical current supplied to the electro-magnetic actuator 34 and, subsequently, defines the magnitude of the pressure within the piston pressure chamber 27c.

The fluid pressure limit of the pressure-control valve 32, i.e. the release pressure of the pressure-control valve 32, can be adjusted by controlling the current applied to the coil wire 44 of the electro-magnetic actuator 34. As less current is applied to the coil wire 44, less axial electromagnetic force is exerted to the spool valve 32, thus the less is the fluid pressure generated by the hydraulic pump 26. This results in an adjustment mechanism for regulating the fluid pressure attainable within the piston pressure chamber 27c of the differential case 12.

When a maximum current is applied to the coil winding 45 of the solenoid actuator 34, the electromagnetic force generated by the electromagnetic actuator 34 and thus the pulling force acting to the pressure-control spool valve 32 is at its maximum. This electromagnetic force displaces the spool member 40 away from the differential case 12 to its closed position when the land portion 41b of the spool member 40 completely blocks the fluid control passage 36. In such a position, the hydraulic pressure attainable in the piston pressure chamber 27c of differential case 12 is sufficient to fully actuate the hydraulic clutch assembly 20 which results in providing the limited slip function in the differential assembly 10, and the limited slip feature is in a fully "ON" condition.

When a minimum or no current is applied to the coil wire 44 of the solenoid actuator 34, the electromagnetic force applied to the pressure-control spool valve 32 is at its minimum, thus a minimum fluid pressure is provided by the spool valve 32 within the piston pressure chamber 27c. In this configuration, the limited slip feature is in a fully "OFF" condition in that the fluid pressure which can be obtained in the piston pressure chamber 27c of the differential case 12 is not enough to engage the clutch assembly 20, essentially disabling the limited slip feature of the hydraulic LSD assembly 10 without affecting the differential capability.

In between the "ON" and "OFF" conditions of the LSD assembly 10, the fluid pressure attainable in the piston pressure chamber 27c may be set at any value by modulating the current applied to the coil wire 44 of the solenoid actuator 34. This provides the LSD assembly 10 with a variable fluid pressure in which the amount of the limited slip available to the differential assembly 10 can be limited and optimized to match various vehicle operating conditions. This provides an opportunity to dynamically control the hydraulic pressure for traction enhancement. For example, if the release pressure is set at a low value, a control system can be used to sense wheel speeds or speed differences and allow for increased hydraulic pressure. The increase in pressure available may be a function of the speed difference. This will result in an optimized amount of limited slip between the fully "ON" and "OFF" conditions.

Therefore, the electronically controlled torque-coupling assembly in accordance with the present invention represents a novel arrangement of the torque-coupling assembly provided with an electro-magnetic actuator for activating a variable pressure-control spool valve for allowing continuously variable torque coupling and distribution.

Figure 12:
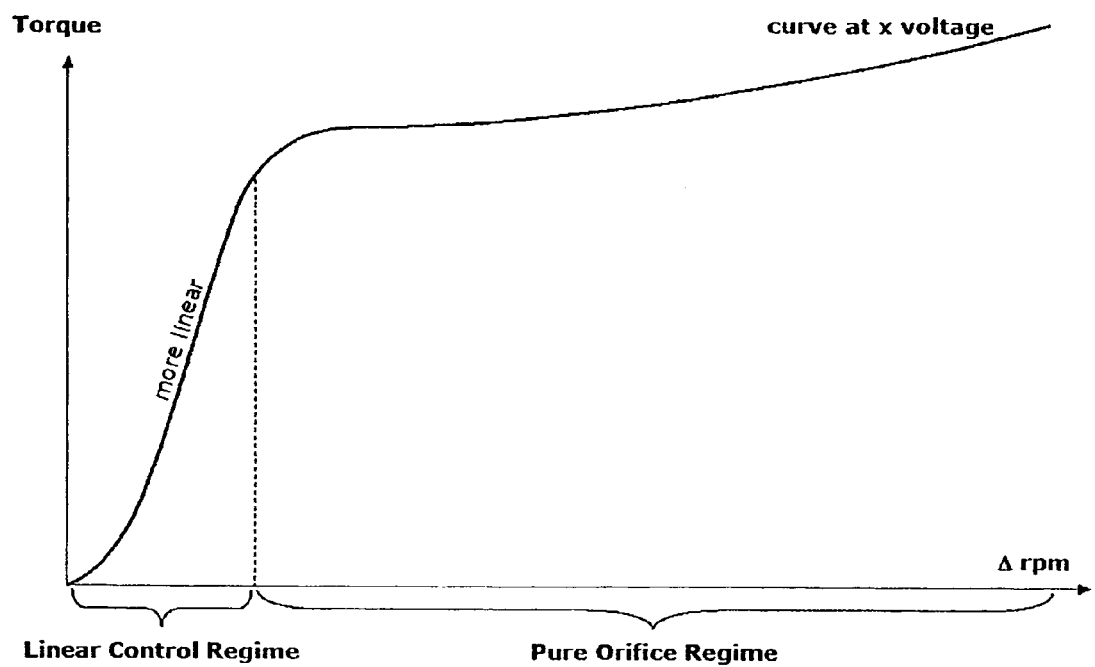
FIG. 12 shows a torque characteristic of the torque-coupling assembly of the present invention with the pressure-control spool valve.

One of the advantages of the present invention is its ability to precisely control the hydraulic fluid pressure generated by the hydraulic pump thanks to the spool valve which requires smaller valve actuation force when compared to compression type valves such as a ball valve or cone valve, thus less amount of electric power needed to control the torque-coupling assembly, and provides more accurate pressure control. As illustrated in FIG. 12, an output torque of the torque-coupling assembly of the present invention first increases in a Linear Control Regime as speed differential between the torque-coupling case and the output shaft increases, then the output torque increases albeit slower in a Pure Orifice Regime when the spool valve maintains its position. In other words, the spool valve is not affected by the rising hydraulic pressure generated by the pump, thus the torque-coupling assembly of the present invention has no "pressure defeat problem" of the torque-coupling assemblies of the prior art, illustrated in FIG. 1. It could also be noted by comparing the torque characteristics of FIGS. 1 and 12, that the torque increase of the torque-coupling assembly of the present invention is substantially more linear in the Linear Control Regime in comparison to the torque-coupling assembly of the prior art.

Another advantage of the torque-coupling assembly of the present invention is that the spool valve is formed inside the wall of the torque-coupling case so that the spool valve does not damage the compact packaging and the mechanical simplicity of the torque-coupling assembly.

Moreover, the inverted radial arrangement of the electro-magnetic coil assembly allows the fluid inlet and outlet holes and the exit opening be positioned at a smaller radial location, effectively eliminating the centrifugal fluid drain problem and allowing the torque coupling assembly to function properly in both the low-speed mobility and high-speed handling situations. Yet another advantage of this invention is that it provides above-mentioned benefits in a compact packaging of the pressure-control valve assembly.

The description of the preferred embodiments of the present invention has been presented for the purpose of illustration in accordance with the provisions of the Patent Statutes. It is not intended to be exhaustive or to limit the invention to the precise forms disclosed. For example, it is to be understood that while the present invention is described in relation to a speed sensitive limited slip differential, the present invention is equally suitable for use in other hydraulically actuated torque couplings, such as torque coupling mechanisms for a vehicular drive-train utilizing a speed sensitive limited slip device. Additionally, although FIG. 2 shows a rear-wheel drive embodiment of the invention, the invention is equally applicable to a front-wheel drive configuration of the differential system.

The foregoing description of the preferred embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A torque-coupling assembly comprising:
   a rotatable torque-coupling case;
   at least one output shaft drivingly operatively connected to said torque-coupling case;
   a friction clutch assembly for selectively engaging and disengaging said torque-coupling case and said at least one output shaft;
   a hydraulic pump for generating a hydraulic fluid pressure to frictionally load said clutch assembly;
   a fluid control passage through which a hydraulic fluid is discharged from said torque-coupling case; and
   a variable pressure-control valve assembly including a spool valve disposed in said fluid control passage and an electro-magnetic actuator for producing a variable axial electro-magnetic force acting against said spool valve so as to selectively adjust the position of said spool valve in said fluid control passage in order to selectively control the flow rate of said hydraulic fluid in said fluid control passage;
   said electro-magnetic actuator including an electro-magnetic coil assembly and an armature axially movable relative thereto;
   said armature is disposed radially inwardly of said electro-magnetic coil assembly.

2. The torque-coupling assembly as defined in claim 1, wherein the position of said spool valve is selectively adjustable between an open position allowing flow of said hydraulic fluid though said fluid control passage and a closed position blocking flow of said hydraulic fluid though said fluid control passage.

3. The torque-coupling assembly as defined in claim 2, wherein said spool valve includes a spool member disposed in a valve chamber for sliding movement therewithin; said spool valve is mounted to said armature.

4. The torque-coupling assembly as defined in claim 3, wherein said valve chamber is formed in said torque-coupling case of said torque-coupling assembly across said fluid control passage.

5. The torque-coupling assembly as defined in claim 4, wherein said spool member includes two substantially cylindrical land portions axially spaced by a central portion of a reduced size relative to said land portions; said land portions of said spool member slidingly engage a complementary inner peripheral surface of said valve chamber.

6. The torque-coupling assembly as defined in claim 5, wherein in said open position said reduced diameter central portion of said spool member is axially registered with said fluid control passage so as to allow hydraulic fluid flow in said fluid control passage through said spool valve across said spool member; and wherein in said closed position one of said land portions of said spool member blocks said fluid control passage.

7. The torque-coupling assembly as defined in claim 3, further comprising a non-rotatable plenum plate mounted to said torque-coupling case so as to form an annular hydraulic plenum chamber defined between said plenum plate and said torque-coupling case.

8. The torque-coupling assembly as defined in claim 7, further comprising a preloaded spring operatively disposed between said plenum plate and said armature for urging said spool valve toward said open position thereof.

9. The torque-coupling assembly as defined in claim 8, wherein said variable electro-magnetic force produced by said electro-magnetic actuator urges said spool member against a resilient force of said spring so as to selectively adjust the position of said spool valve between an open position allowing flow of said hydraulic fluid through said fluid control passage and a closed position blocking flow of said hydraulic fluid through said fluid control passage.

10. The torque-coupling assembly as defined in claim 7, wherein said electro-magnetic actuator is non-rotatably secured to said plenum plate.

11. The torque-coupling assembly as defined in claim 7, further comprising an annular bushing disposed within an annular bore of said armature for rotatably supporting said plenum plate to said torque-coupling case and a plenum passage formed between said armature and said bushing for providing fluid communication through said electro-magnetic actuator.

12. The torque-coupling assembly as defined in claim 11, wherein said plenum passage is defined by a set of circumferentially distributed axial passageways formed in said bushing.

13. The torque-coupling assembly as defined in claim 1, further including a piston assembly disposed within said torque-coupling case between said pump and said clutch assembly and defining a pressure chamber, wherein said variable pressure-control valve assembly selectively controls a hydraulic pressure attainable within said pressure chamber.

14. The torque-coupling assembly as defined in claim 13, wherein said variable pressure-control valve assembly selectively controls said pressure attainable within said pressure chamber between a maximum pressure when said spool valve is in said closed position and a minimum pressure when said spool valve is in said open position.

15. The torque-coupling assembly as defined in claim 14, wherein said minimum pressure attainable within said pressure chamber is at a level that prevents actuation of said friction clutch assembly.

16. The torque-coupling assembly as defined in claim 14, wherein said maximum pressure attainable within said pressure chamber is at a level that enables complete actuation of said friction clutch assembly.

17. The torque-coupling assembly of claim 14, wherein said hydraulic pressure attainable within said pressure chamber is adjustable between said minimum pressure and said maximum pressure so as to enable partial actuation of said friction clutch assembly.

18. The torque-coupling assembly as defined in claim 1, wherein said selective control of said friction clutch assembly is determined in response to at least one vehicle parameter.

19. A torque-coupling assembly comprising:
a rotatable torque-coupling case;
at least one output shaft drivingly operatively connected to said torque-coupling case;
a friction clutch assembly for selectively engaging and disengaging said torque-coupling case and said at least one output shaft;
a hydraulic pump for generating a hydraulic fluid pressure to frictionally load said clutch assembly;
a fluid control passage through which a hydraulic fluid is discharged from said torque-coupling case;
a non-rotatable plenum plate mounted to said torque-coupling case so as to form an annular hydraulic plenum chamber defined between said plenum plate and said torque-coupling case; and
a variable pressure-control valve assembly including a spool valve disposed in said fluid control passage and an electro-magnetic actuator disposed in said plenum chamber for producing a variable axial electro-magnetic force acting against said spool valve so as to selectively adjust the position of said spool valve in said fluid control passage in order to selectively control the flow rate of said hydraulic fluid in said fluid control passage;
said electro-magnetic actuator including an electro-magnetic coil assembly and an armature axially movable relative thereto;
the position of said spool valve being selectively adjustable between an open position allowing flow of said hydraulic fluid through said fluid control passage and a closed position blocking flow of said hydraulic fluid through said fluid control passage;
said spool valve including a spool member disposed in a valve chamber for sliding movement therewithin and mounted to said armature.

20. The torque-coupling assembly as defined in claim 19, further comprising a preloaded spring operatively disposed between said plenum plate and said armature for urging said spool valve toward said open position thereof.

* * * * *